United States Patent
Audeon et al.

(10) Patent No.: US 8,192,149 B2
(45) Date of Patent: Jun. 5, 2012

(54) TURBINE OR COMPRESSOR STAGE FOR A TURBOJET

(75) Inventors: David Audeon, Massy (FR); David Da Silva, Juvisy sur Orge (FR)

(73) Assignee: SNECMA, Paris (FR)

( * ) Notice: Subject to any disclaimer, the term of this patent is extended or adjusted under 35 U.S.C. 154(b) by 706 days.

(21) Appl. No.: 12/266,813

(22) Filed: Nov. 7, 2008

(65) Prior Publication Data

US 2009/0123273 A1    May 14, 2009

(30) Foreign Application Priority Data

Nov. 13, 2007    (FR) ..................... 07 07939

(51) Int. Cl.
*F01D 5/20* (2006.01)
*F01D 9/00* (2006.01)

(52) U.S. Cl. ............ 415/173.1; 415/214.1; 24/542

(58) Field of Classification Search .......... 415/170.1, 415/173.1, 214.1; 24/455, 20 R, 542
See application file for complete search history.

(56) References Cited

U.S. PATENT DOCUMENTS

| | | | |
|---|---|---|---|
| 2,999,631 A * | 9/1961 | Wollmershauser | 416/191 |
| 3,622,737 A * | 11/1971 | Trudeau | 165/9 |
| 4,856,963 A * | 8/1989 | Klapproth et al. | 415/190 |
| 6,412,149 B1 * | 7/2002 | Overberg | 24/455 |
| 6,435,820 B1 * | 8/2002 | Overberg | 415/138 |
| 6,505,837 B1 * | 1/2003 | Heshmat | 277/411 |

FOREIGN PATENT DOCUMENTS

| | | |
|---|---|---|
| EP | 1 079 076 A2 | 2/2001 |
| EP | 1 717 418 A1 | 11/2006 |

OTHER PUBLICATIONS

U.S. Appl. No. 12/266,929, filed Nov. 7, 2008, Audeon, et al.
U.S. Appl. No. 12/257,761, filed Oct. 24, 2008, Audeon, et al.

* cited by examiner

*Primary Examiner* — Caridad Everhart
(74) *Attorney, Agent, or Firm* — Oblon, Spivak, McClelland, Maier & Neustadt, L.L.P.

(57) ABSTRACT

A turbojet turbine or compressor stage is disclosed. The stage includes at least one rotor disk mounted inside a sectorized ring supported by a casing and including a circumferential flange radially clamped on an annular rail of the casing by a substantially C-shaped cross-section annular locking device which is axially engaged on the casing rail and on the flange of the ring. A substantially cylindrical heat shielding foil is interposed between the ring and the device. The foil or the device includes at least one extra thickness which respectively bears on the device, or the foil, to radially immobilize this foil.

5 Claims, 2 Drawing Sheets

TURBINE OR COMPRESSOR STAGE FOR A TURBOJET

The present invention relates to a turbine or compressor stage, particularly for a plane turbojet.

TECHNOLOGICAL BACKGROUND OF THE INVENTION

A stage of this type comprises a distributor formed by a row of annular fixed guide vanes supported by a casing of the compressor or the turbine, and a rotor disk mounted upstream from the distributor inside a sectorized ring hooked on the casing.

The distributor comprises two respectively inner and outer annular walls, the fixed guide vanes extending therebetween.

The ring comprises, at one end thereof, a circumferential flange which is radially clamped on an annular rail of the casing through a substantially C-shaped cross-section annular locking device, which is axially engaged on the casing rail and on the circumferential flange of the ring. The locking device comprises two annular walls, respectively inner and outer, which are connected together through a substantially radial wall. This device is sectorized and made up of a plurality of locks circumferentially positioned in an abutting manner, each lock being generally engaged on the flange of only one sector of the ring and on a corresponding portion of the casing rail.

It is known that an annular sealing and heat shielding foil should be mounted between the downstream end of the ring and the upstream end of the outer annular wall of the distributor, notably to limit the radially outward leaks of hot gases flowing in the gas stream of the turbine or compressor and to thermally protect the locking device.

In the current technique, this foil is substantially cylindrical and interposed between the ring and the inner annular wall of the locking device. However, it is not correctly radially immobilized and can then vibrate in the operating state, and be damaged.

Further, each lock is engaged on the casing rail and on the circumferential flange of one ring sector with some radial preload. In the operating state, a radial gradient of a relatively substantial temperature appears in each ring sector, which causes a "discambering" of this ring sector. This phenomenon essentially produces into an increase of the curvature radius of the ring sector, which increases the strains in the median portion of the lock and can reduce its lifetime.

SUMMARY OF THE INVENTION

The invention notably aims to provide a simple, efficient and cost effective solution to at least a part of those problems.

The invention proposes therefore a turbine or compressor stage, particularly for a turbojet, comprising at least one rotor disk mounted inside a sectorized ring supported by a casing and comprising a circumferential flange radially clamped on an annular rail of the casing by a substantially C-shaped cross-section annular locking device which is axially engaged on the casing rail and on the flange of the ring and which comprises two annular walls, respectively inner and outer, connected together through a substantially radial wall, a substantially cylindrical heat shielding foil being interposed between the ring and the inner wall of the device, wherein the foil, or the inner wall of the device, comprises at least an extra thickness which radially extends toward the device, or the foil, respectively, and comprises radial bearing means on the device, or the foil.

According to the invention, the heat shielding foil comprises a portion of greater thickness, or radial dimension, which extends toward the device and is adapted to radially bear against this device to radially immobilize the foil, or the inner wall of the device comprises a portion of greater thickness, or radial dimension, which extends toward the foil and is adapted to radially bear against this foil to immobilize it in a radial direction. This radial bearing provides a small radial preload for the foil which is then radially immobilized and prevented from vibrate in the operating state of the turbojet.

The extra thickness of the foil is for example made up of an annular protuberance formed in a protruding manner on an outer surface of the foil and having radial bearing means on the inner wall of the locking device.

Alternatively, the locking device comprises at least one extra thickness made up of a circumferentially directed protuberance formed in a protruding manner on an inner surface of its inner wall and having radial bearing means on the foil.

The locking device can comprise only one annular protuberance which extends on 360°, or circumferential protuberances which are spaced one from the others by a distance. The, or each, protuberance allows for the device to be rigidified in order to further withstand the strains communicated by the ring sector in the operating state. The circumferential protuberances allow for the amount of material needed to provide the radial extra thickness of the device to be limited. They can be provided by machining, e.g. by milling, the inner wall of the device.

When the device is sectorized and made up of a plurality of locks circumferentially disposed in an abutting manner, at least some of those locks each have a circumferential protuberance formed in a protruding manner on an inner surface of its inner wall.

Some locks of the device can then comprise a radial extra thickness at the inner walls thereof which bears on the foil, and the other locks of the device can be similar to those of the prior technique and be radially spaced from the foil.

The protuberance of each lock extends for example in a circumferential direction on at least a part of the width, or angular extent, of the lock in order to cause a small weight variation for this lock.

This protuberance is preferably formed on a median portion of the inner wall of the lock. In that last instance, the protuberance reinforces the median portion of the lock which can then withstand the stresses communicated by the median portion of the ring sector and counter the discambering of this ring sector. One can then notice small variations of the radial backlash between the crests of the vanes of the rotor disk and the ring sectors, which improves the performances of the turbojet.

The invention further relates to a turbojet, wherein it comprises at least a turbine or compressor stage such as above described.

The invention also relates to an annular locking device for a turbine or compressor stage of the aforesaid type, comprising two annular walls, respectively inner and outer, connected together through a third substantially radial wall, so that the lock has a C-shaped cross-section, wherein its inner wall comprises at least one extra thickness which radially extends inwardly.

The invention finally relates to a substantially cylindrical heat shielding foil for a turbine or compressor stage of the aforesaid type, wherein it comprises at least one extra thickness protruding on its outer surface.

BRIEF DESCRIPTION OF THE DRAWINGS

The invention will be more fully understood and other features, details and advantages thereof will more clearly appear when reading the following description, given by way of non-limiting example and with reference to the accompanying drawings, in which.

MORE DETAILED DESCRIPTION

Figure 1:
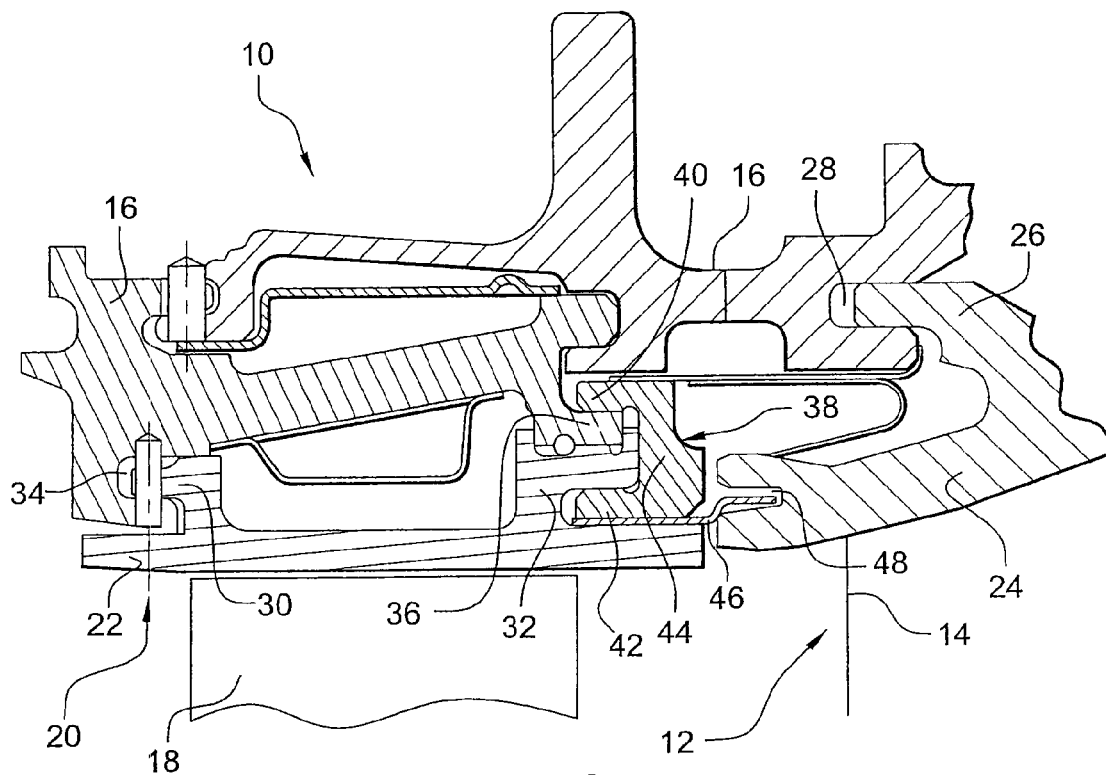
FIG. 1 is an axial, partial sectional schematic half view of a turbine stage according to the prior technique.

Referring first to FIG. 1, it shows a turbine stage 10 for a turbojet, comprising a distributor 12 made up of an annular row of fixed vanes 14 supported by a casing 16 of the turbine, and a rotor disk 18 mounted upstream from the distributor 12 and rotating in a sectorized ring 20 made up of a plurality of sectors 22 which are circumferentially supported, in an abutting manner, on the casing 16 of the turbine.

The distributor 12 comprises two respectively outer 24 and inner (not shown) annular walls, which delimit therebetween the annular stream of gases in the turbine and between which the vanes 14 radially extend. The outer wall 24 of the distributor comprises a cylindrical flange 26 directed upstream and adapted to be engaged in an annular groove 28 directed downstream from the casing 16.

Each ring sector 22 comprises a circumferentially directed wall which comprises, at its upstream and downstream ends, circumferential flanges 30, 32 hooking on the casing 16 of the turbine. The circumferential upstream flanges 30 of the ring sectors are directed upstream and engage in an annular groove 34 directed downstream from the casing 16.

The circumferential downstream flanges 32 of the sectors are located spaced from the downstream end of the circumferential wall of the ring sector. They are directed downstream and radially clamped on a cylindrical rail 36 of the casing by means of an annular C-shaped cross-section locking device 38, the opening of which is axially directed upstream and which is axially engaged from upstream on the casing rail 36 and on the circumferential downstream flanges 32 of the ring sectors by elastic deformation. The downstream flanges 32 of the ring sectors and the rail 36 of the casing have substantially the same curvature radius in the idle state of the turbojet.

The locking device 38 comprises two coaxial annular walls 40 and 42, respectively radially inner and outer, which are connected together, at their downstream ends, by a radial wall 44, and which are respectively engaged on the outside of the casing rail 36 and on the inside of the downstream flanges 32 of the ring sectors.

The radial wall 44 of the device is axially interposed between the downstream ends of the rail 36 and flanges 32 on one hand and the upstream end of the outer wall 24 of the distributor 12 on the other hand, in order to prohibit the locking device from axially displacing downstream and the device 38 from disengaging from the casing rail 36 and from the flanges 32 of the ring sectors.

The locking device 38 is sectorized and made up of a plurality of locks circumferentially disposed in an abutting manner, each lock having two circumferentially directed parallel walls 40, 42, respectively inner and outer, connected together by a radial wall 46.

Each lock of the device 38 is engaged on the casing rail 36 and on the circumferential flange 32 of a ring sector with some radial preload. The lock elastically bends in a radial direction due to the outspreading of its circumferential walls 40, 42 when axially engaging on the rail 36 and the downstream flange 32 of the sector.

When operating, the ring sector 22 is subjected to a substantial temperature gradient in a radial direction, which translates into a "discambering" of the ring sector, the curvature radius of which being then greater than in the free of strain state, its curvature radius becoming greater than that of the rail 36 of the casing. This "discambering" notably produces an inwardly radial displacement of the median portion of the circumferential flange 32 of the sector, and then into substantial increase of the strains applied to the median portion of the corresponding lock, which can reduce its lifetime.

A substantially cylindrical sealing and heat shielding foil 46 is mounted between the ring sectors 22 and the outer wall 24 of the distributor in order to prohibit hot gases from leaking radially outwardly from the gas stream of the turbine, and to thermally protect the locking device 38 and the neighboring pieces.

The upstream end of this foil 46 is axially engaged on the downstream ends of the circumferential walls of the ring sectors 22 and is enclosed with the inner wall 42 of the device. Its downstream end is engaged in an annular groove 48 directed upstream and formed at the upstream end of the outer wall 24 of the distributor.

This foil 46 is not radially immobilized and vibrates in the operating state, which can cause damage to this foil and even to the neighboring pieces.

The invention permits one to at least partially overcome the drawbacks above described by means of a radial extra thickness formed on the inner wall of the device 38, or on the foil 46, this extra thickness respectively bearing on the foil, or on the device, so as to radially immobilize this foil on the downstream end of the ring sectors 22.

Figure 2:
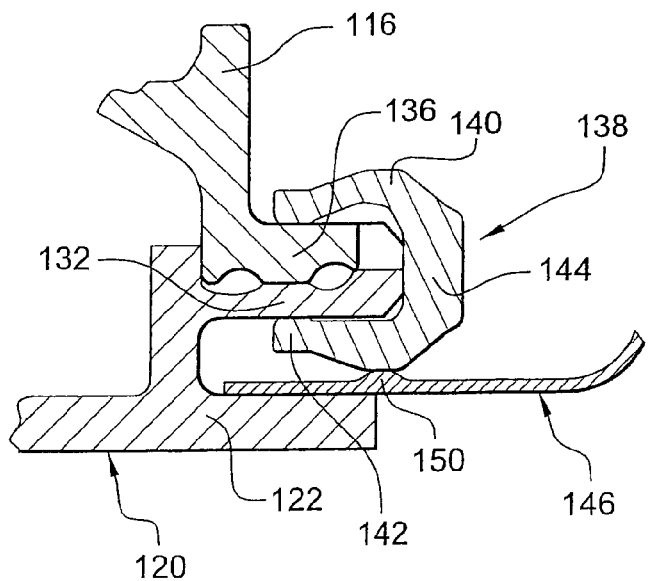
FIG. 2 is an axial, partial sectional schematic half view of a turbine stage according to the present invention, drawn to a greater scale.

In the exemplary embodiment shown in FIG. 2, the extra thickness is formed on the foil 146 which comprises, next to its upstream end, an annular protuberance 150 which extends on 360° around the axis of the foil. This protuberance 150 is formed in a protruding manner on the outer cylindrical surface of the foil and extends radially outwardly.

The external periphery of the protuberance 150 comprises a bearing surface on the inner surface of the inner wall 142 of the device 138. This protuberance allows for the foil to be radially clamped on the cylindrical outer surface of the downstream end of the ring 120.

In that case, the foil 146 can be engaged on the downstream end of the ring before mounting the device 138. When the device 138 axially engages on the casing rail 136 and on the flanges 132 of the ring sectors, the walls 140, 142 of the device outspread one from the other and the inner wall 142 comes in between the downstream flanges 132 of the sectors and the foil 146 and applies this foil on the downstream ends of the ring sectors 122 with some radial preload.

Figure 3:
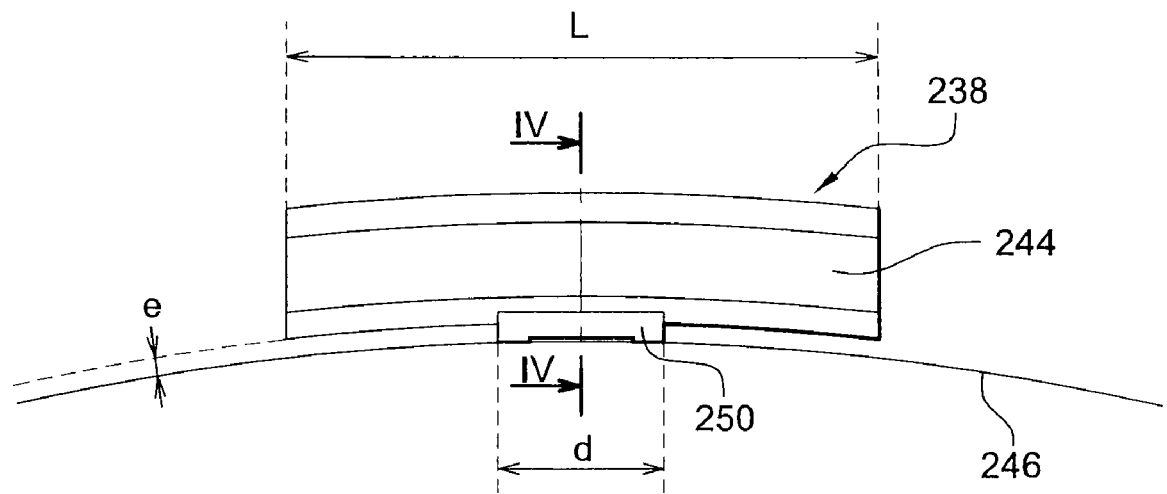
FIG. 3 is a partial schematic front view of a lock and a heat shielding foil of an alternate embodiment of the stage according to the invention, viewed from downstream.
Figure 4:
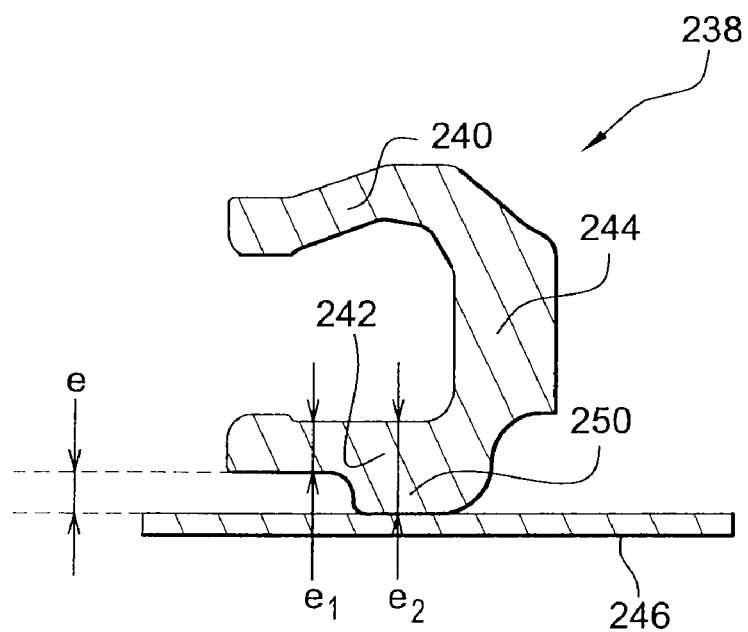
FIG. 4 is cross-sectional view, taken from the line IV-IV of FIG. 3, drawn to a greater scale.

In the alternate embodiment shown in FIGS. 3 and 4, the foil 246 is comparable to the one of the prior technique and the inner wall 242 of the locking device 238 comprises extra thicknesses made up of circumferentially directed protuberances 250 which extend radially inwardly and which radially bear on the cylindrical outer surface of the foil 246 at their inner periphery.

The protuberances 250 are formed in a protruding manner on the inner surface of the inner wall 242 of the device, and are located spaced one from the others. When the device 238 is made up of a plurality of locks disposed in an abutting manner, at least some of those locks comprise a circumferential protuberance 250, as illustrated in FIG. 3. The locks which comprise protuberances 250 radially bear against the foil 246 whilst the other locks, which are free from protuberances, are spaced e from the foil by a radial distance. This distance e substantially corresponds to the value of the extra thickness $(e_2-e_1)$, i.e. to the difference between the thickness $e_2$ of the protuberance 250 and the thickness $e_1$ of the rest of the inner wall 242 of the lock.

In the illustrated example, the protuberance 250 extends on a median portion of the inner wall of the lock so as to reinforce this portion which is subjected to substantial strains in the operating state. The protuberance 250 has a width d, or angular extent, which is about the half, preferably the third, and for example the quarter, of the width L of the lock 238. The protuberance 250 can be obtained by machining, and for example by milling, the end portions of the inner wall 242 of the lock.

The protuberances 250 of the device as well allow for the foil 246 to be maintained on the ring sectors with a small radial preload.

The foil 246 and the locking device 238 can be mounted in the same manner as in the embodiment of FIG. 2.

What is claimed is:

1. A turbine or compressor stage for a turbojet, comprising:
at least one rotor disk mounted inside a sectorized ring supported by a casing and comprising a circumferential flange radially clamped on an annular rail of the casing by a substantially C-shaped cross-section annular locking device which is axially engaged on the casing rail and on the flange of the ring and which comprises two annular walls, respectively inner and outer, connected together through a substantially radial wall, a substantially cylindrical heat shielding foil being interposed between the ring and the inner wall of the device,
wherein the foil comprises at least one annular protuberance which is formed in a protruding manner on an outer surface of the foil and which extends on 360° around an axis of the foil, said annular protuberance having radial bearing means on the inner wall of the locking device.

2. A turbojet comprising at least one turbine or compressor stage according to claim 1.

3. A stage according to claim 1, wherein the protuberance protrudes in a radially outward direction.

4. A stage according to claim 1, wherein the locking device comprises at least one circumferentially directed protuberance formed in a protruding manner on an inner surface of the inner wall and having radial bearing means on the foil radial bearing means.

5. A stage according to claim 4, wherein the radial bearing means of the locking device is integrally formed with the locking device and the radial bearing means of the foil is integrally formed with the foil.

* * * * *